May 23, 1972     A. M. FOOTE     3,664,579
COMBINATION HUMIDISTAT AND HEATER
Filed Aug. 12, 1970     2 Sheets-Sheet 1
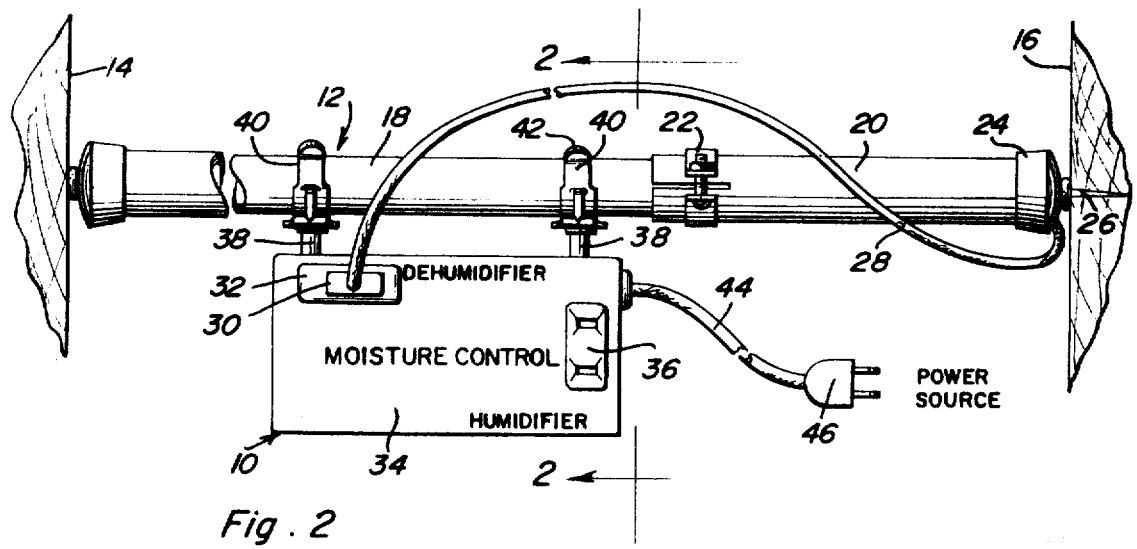
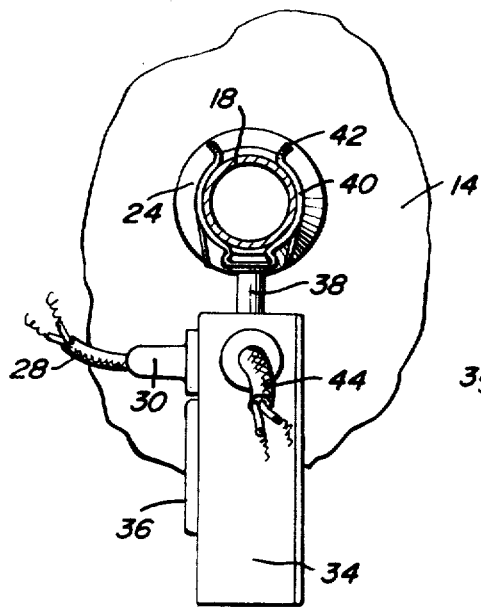
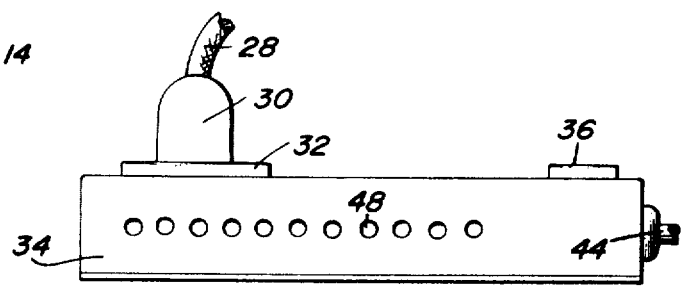
Allen M. Foote
INVENTOR.
BY *Clarence A. O'Brien*
*and Harvey B. Jacobson*
Attorneys

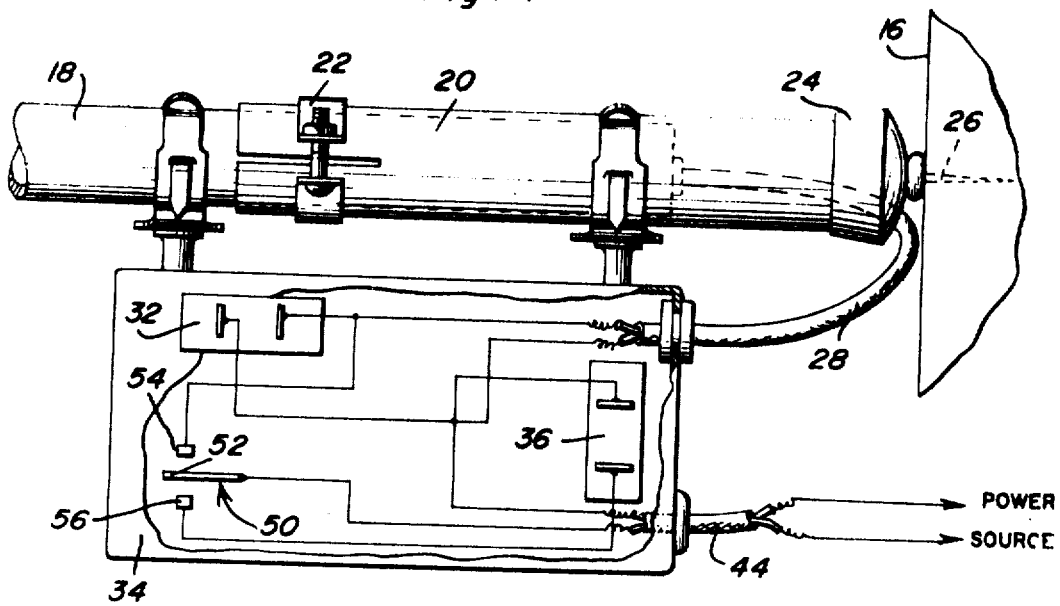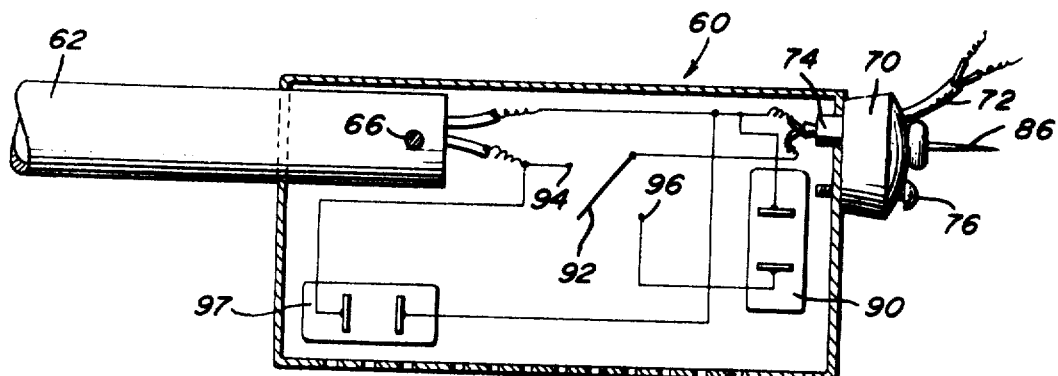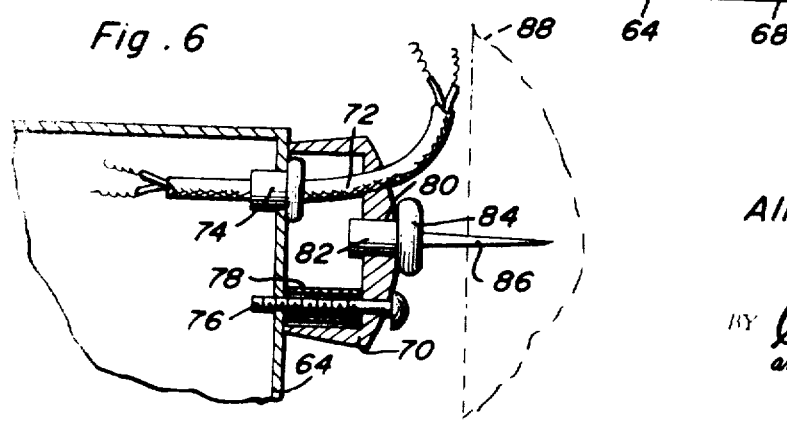

United States Patent Office 3,664,579
Patented May 23, 1972

3,664,579
COMBINATION HUMIDISTAT AND HEATER
Allen M. Foote, Flat Rock, N.C.
(P.O. Box 1610, Hendersonville, N.C. 28739)
Filed Aug. 12, 1970, Ser. No. 63,484
Int. Cl. G05d 22/02
U.S. Cl. 236—44
11 Claims

ABSTRACT OF THE DISCLOSURE

A humidistat for controlling moisture conditions in a piano, cigar case, or any other small enclosure where moisture control is necessary. The humidistat is combined with a heating device or a dehumidifier and a moisture producing device or humidifier and includes a housing attached to a heater or dehumidifier either by the use of a snap-on connection or a permanent installation to facilitate mounting of the humidistat in proper relation to the enclosed area and the heater or dehumidifier and the moisture producing device or humidifier.

BACKGROUND OF THE INVENTION

Field of the invention

The present invention generally relates to humidity control devices and more particularly to a humidistat associated with a heater and a humidifier associated with an enclosed area for maintaining the humidity conditions in the enclosed area at a desired level. The humidistat may be either mounted on an already existing heating device by the use of snap-on clips or may be permanently associated with a heater to provide a unitary assembly.

Description of the prior art

Applicant's prior Pat. No. 2,511,910 discloses a heating device generally in the form of an elongated, rigid tubular member which has been extensively used commercially under the trademark "Dampp-Chaser" and has been found quite effective when used in the interior of pianos or other small enclosed areas to prevent the existence of excessive humidity which is detrimental to the proper operation of a piano or the like. Applicant's prior Pat. No. 3,094,603 and 3,119,977 disclose additional improvements made in this type of heater. While such heaters are quite effective in eliminating high humidity conditions, it is necessary to manually connect and disconnect heaters of this type from a source of electric energy. This requirement sometimes results in the owner forgetting to plug in the heater or forgetting to unplug the heater. Also, in certain geographical areas and under certain conditions, excessive changes in atmospheric humidity conditions frequently required that the heater be connected or disconnected at frequent intervals.

SUMMARY OF THE INVENTION

It is an object of the present invention to provide a humidistat for automatically controlling a heater or dehumidifier and a moisture producing device or humidifier thereby providing accurate and continuous positive control of the humidity conditions within the interior of a piano, cigar case or other enclosed area where it is desirable to maintain the relative humidity at substantially a constant level regardless of changes in external humidity conditions.

It is another object of the invention to provide a humidistat in the form of a relatively small housing that may be attached to already existing heaters by the use of clamps or snap clips which are readily attached to an existing rigid tubular member forming the external housing of the heater or a permanently connected housing associated with a heater to provide a combined heater and humidistat assembly which may be previously assembled and distributed as a unit.

A further object of the invention is to provide a humidistat having an electrical cord connected thereto and two female sockets associated therewith into which the heater and humidifier may be plugged thus eliminating any necessity of modification of existing heaters or dehumidifiers.

Yet another feature of the invention is to provide a combination humidistat and heater in which the humidistat is either snapped onto the heater or permanently combined therewith in which the assembly is relatively inexpensive to manufacture, easy to install, accurate in control of relative humidity and dependable in operation.

DESCRIPTION OF THE DRAWINGS

FIG. 1 is an elevational view illustrating the combination humidistat and heater installed between opposed surfaces.

FIG. 2 is a sectional view taken substantially upon a plane passing along section line 2—2 of FIG. 1 illustrating the relationship of the humidistat to the heater.

FIG. 3 is a side elevational view of the humidistat illustrating the apertures in the housing for circulation of air in relation thereto.

FIG. 4 is a plan view illustrating another position of the humidistat on the heater and schematically illustrating the electrical association of the power source and the female plugs for the heater and humidifier.

FIG. 5 is a detailed view of a modified form of the invention in which the humidistat is permanently attached directly to the end of the heater and illustrating schematically the electrical circuitry within the humidistat.

FIG. 6 is a detailed sectional view of the mounting structure for the permanently attached type of humidistat.

DESCRIPTION OF PREFERRED EMBODIMENTS

Referring now to FIG. 1, the humidistat of the present invention is generally designated by the numeral 10 and is illustrated in association with a heater 12 supported between opposing walls 14 and 16 which may conveniently be the interior walls or structures found in a piano although it is pointed out that the invention may be incorporated into other enclosed areas. For example the device may be employed in musical instruments, cigar cases or in cabinets for various equipment where it is necessary or desirable to maintain a predetermined humidity condition.

The heater 12 is in the form of a rigid tubular member 18 having a telescopic tubular extension 20 on one or both ends thereof secured in adjusted position by a split clamp assembly 22. The outer end of each tubular extension 20 is provided with a cap 24 of resilient material such as plastic, rubber or the like that has a central opening for receiving a pointed mounting member 26 which enables the heater 12 to be installed by telescoping the extensions 20 inwardly and inserting the heater 12 into the desired position and then manually extending the extensions 20 so that the pointed members 26 penetrate into the opposing walls 14 and 16 thus securely mounting the heater 12 in position. This type of heater construction is known and the interior details thereof are not illustrated but the heater does include an electric cord 28 having a male plug 30 on the free end thereof with the cord 28 entering the heater through an eccentric opening in the end cap 24. The plug 30 in the "Dampp-Chaser" heaters or dehumidifiers normally would be plugged into a female wall outlet. However, in this invention, the humidistat 10 includes a female socket 32 in which the male plug 30 may be plugged. The electric cord 28 may be of a length sufficient to enable the plug 30 to reach the socket 32 without any excess length of the cord. The humidistat 10 includes a rigid hollow housing 34 of any suitable shape and configuration but need only be of generally rectangular configuration of a thickness not substantially greater than the diameter of the tubular heater, a vertical height, of several times the diameter of the tubular heater and a length sufficient to accommodate the humidity sensor and switch assembly and the female socket 32 and a female socket 36 into which a humidifier is plugged in by employing a similar type of male plug and electric cord. The surface of the housing 34 may be provided with suitable instructions imprinted thereon or mounted thereon in any suitable manner to instruct the person in the proper manner of installation of the device.

The top edge of the housing 34 is provided with a pair of projecting mounting members 38 in the form of non-metallic spacers to which is attached the bight portion of a spring clip 40 having outwardly flared terminal end 42 forming an entrance into the clip for facilitating insertion of the clip onto the tubular member 18 of the heater 12. This construction enables the humidistat 10 to be quickly and easily attached to an existing heater 12 by merely snapping the clips 40 to the heater 12 either on the central section 18 thereof or on one of the extensions 20 as illustrated in FIG. 4 which arrangement would enable the electric cord 28 to be materially shortened. The spring clips 40 are themselves of conventional construction and have adequate resilient strength to support the humidistat 10 and associated electrical cords, plugs and the like from the heater for an extended period of time without accidental disengagement.

The humidistat 10 includes an electric cord 44 extending therefrom for connection with a power source and includes a male plug 46 for plugging into a conventional female wall socket or the like to supply electrical energy to the circuits in the housing 34. The housing 34 is provided with a plurality of apertures 48 therein which are located in the bottom edge surface of the housing 34 to provide for circulation of ambient air into the interior of the housing 34. Disposed interiorly of the housing 34 is a moisture sensitive switch element of a conventional construction and which is illustrated schematically in FIG. 4 and designated by numeral 50 and which includes a single pole double-throw switch element 52 which may contact a contact 54 or a contact 56. When the switch element 52 contacts the contact 54, the plug 32 will be energized for energizing the heater or heaters as the case may be and when the contact 56 is contacted by the switch member 52, the socket 36 will be energized thus energizing the humidifier. In FIG. 4, the heater illustrated is shown as permanently attached to the humidistat by a short electrical cord 28 which enables the socket 32 to be utilized for connection to additional heaters if required. Thus, the humidistat even though snapped onto the heater becomes a permanent part of the heater in this construction and the socket 32 enables an additional heater or heaters to be connected to and controlled by the humidistat 10.

FIGS. 5 and 6 disclose another embodiment of permanently attached humidistat 60 that is mounted permanently on the end of a rigid tubular heater 62 and the humidistat 60 includes a hollow housing or casing 64 which receives the terminal end of the heater 62 and is permanently attached thereto by any suitable connecting device 66. The housing 64 includes holes 68 therein and on the end wall thereof opposite from the end wall which receives the heater 62, there is provided a cap member 70, similar to the cap member 24 which receives the main power cord 72 with the cord 72 extending through a grommet 74 in the end wall of the housing 64. The cap 70 is retained on the end wall of the housing 64 by a screw-threaded fastener 76 threaded into the end wall of the housing 64 and a rigid spacer 78 encircles the screw-threaded member 76 between the exterior surface of the housing 64 and the inner wall of the cap 70 to prevent the cap 70 from being collapsed by the screw-threaded fastener 76 inasmuch as the cap 70 is constructed of plastic, rubber or the like. Also, the cap 70 is provided with a central aperture 80 which receives a projection 82 on the head 84 of a pointed pin 86 which is used to mount the assembly between opposing walls, such as wall 88 which is equivalent to the mounting structure employed in the assembly in FIG. 1.

The humidistat 60 is also provided with a female socket 90 for receiving the male plug of the humidifier. Interiorly of the housing 64, the humidistat switching element 92 is movable into engagement with contacts 94 and 96 to either energize the heater or dehumidifier 62 or the humidifier which is plugged into the female socket 90 or additional dehumidifiers plugged into female socket 97.

In using the humidistat in combination with the heater 12 and the humidifier (not shown), a piano, other musical instrument or other enclosed area is fully protected against damage caused by high humidity (excessive moisture), low humidity (excessive dryness) and excessive rise and fall in humidity. Excessive humidity causes sticking keys, sluggish action and rust. Excessive dryness causes loose tuning pins, loose actions, ribs, bridges and soundboards. The leading cause of a piano failing to stay in tune is changes (rise and fall) in humidity. To assure the best performance from the piano, to eliminate costly repairs, to assure the piano staying in tune better and longer, and to protect the investment made in the piano, a humidistat in accordance with the present invention combined with the heater and humidifier is effective. The automatic humidistat relieves the piano owner of the responsibility of manually plugging in and unplugging the heater every time the humidity rises and falls from the safe 42% relative humidity. In very dry climates where the humidity rarely goes above the 42% relative humidity, the humidifier can be installed inside the piano and will be safely and automatically turned on only when necessary to increase relative humidity up to a safe 42% inside the piano and, of course, will turn the humidifier off when the relative humidity has reached 42%.

By placing the humidistat within the interior of the piano, a variable cycling action will be provided which produces a variable drying action which is in exact proportion to the amount of humidity present. In contrast, if the humidistat were mounted outside of the piano, the drying action of the heater would not affect the humidity conditions within the room and thus, the heater would be operated by the room conditions and thus might stay off or on for too long a period.

The present humidity conditions which will actuate the humidistat may be varied by employing various humidistat switches of preset levels or by the use of an adjustable knob for adjusting the level of humidity which will actuate the humidistat switch. In some installations, if more than one humidifier is employed, a short lead to a humidifier can be permanently connected to the humidistat casing in the same manner as the heater leads are attached to the housing in FIG. 4. This would eliminate the necessity of a long cord and plug on one heater and one humidifier and enable an additional heater or heaters or additional humidifier or humidifiers to be added to the assembly when and if required. The spacers or tubular members 38 serve to retain a space between the heater and the humidistat and this space has been calculated to provide only the appropriate amount of feedback of the dehumidifer's drying action to the control box to cause the heater to cycle on and off in the humidity ranges from the ideal 42% to about 65% relative humidity with a variable ratio of dehumidifier "on" time to dehumidifier "off" time, thus in effect over each period of 5 or 6 hours, to provide an average amount of heat to vary in accordance with the amount of humidity present. Thus, only one wattage heater need be used for all pianos, equipped with the proportioning of the moisture control, due to this unique placement. Otherwise, the full maximum wattage of the heater being turned on immediately and continuously as soon as the relative humidity when even only slightly above 42% might still be injurious to the piano. This is what would happen if the control is placed at a distance from the heater, either in the piano case or somewhere outside the piano case, where it responds more to room conditions, rather than internal conditions. By actual test, the cycling action does in fact provide a variable average wattage heat with a single wattage heater in somewhat a similar fashion to a thermostat on a furnace or the like. This spacing of one-half inch will provide pianos with a variable average heat exactly to suit its requirements for ideal operation. This will also happen when the humidifier and dehumidifier are both in operation, except that the humidifier will keep the moisture level from ever dropping below the preset value. In the embodiment illustrated in FIGS. 5 and 6, the heating element in the heater will end in spaced relation to the point where tubular heater 62 actually enters the humidistat casing 64 so that the ideal feedback of just the right amount of heat for the dehumidifying heater will reach the sensing element of the control to provide the average heat proportioning as outlined above.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a heater having an elongated rigid member forming the exterior thereof and adapted to be supported within an enclosed space subject to changes in humidity conditions, a control device comprising a housing, means supporting the housing from the heater, means supplying the housing with electrical energy from a source, means in the housing electrically connected with the heater for energizing the heater, and means carried by said housing to connect and disconnect the source of electrical energy to the means electrically connected to the heater in response to humidity conditions in the enclosed area.

2. The structure as defined in claim 1 wherein said housing is provided with openings to enable circulation of ambient air between the interior of the housing and the enclosed area.

3. The structure as defined in claim 1 wherein said means connecting the source of electrical energy to the means electrically connected to the heater including a humidity responsive switch.

4. The structure as defined in claim 3 wherein said means mounting the housing from the heater includes spring clip means attached to said housing and detachably engaging the rigid member forming the exterior of the heater to enable installation of the control device onto the heater.

5. The structure as defined in claim 4 wherein said heater includes an electric cord having a male plug on the end thereof, said means electrically connected to the heater including a female plug on the housing receiving the male plug.

6. The structure as defined in claim 5 wherein said spring clip means is spaced from the housing in order to control the transfer of drying heat from the heater to the control device.

7. The structure as defined in claim 3 wherein said means mounting the housing on the heater including an opening in one side of the housing telescopically receiving the end of the heater with the end of the heater being fixed interiorly of the housing.

8. The structure as defined in claim 3 together with an outlet socket in the housing electrically connected to the switch means for energizing the outlet when humidity conditions in the enclosed area drop below a predetermined relative humidity for energizing the outlet socket, said outlet socket adapted to be electrically connected to a humidifier for increasing the relative humidity when the relative humidity in the enclosed area reaches a present low condition.

9. The structure as defined in claim 1 wherein the heater is provided with a longitudinally adjustable end member on at least one end thereof, and a pointed member extending axially from each end of the heater whereby the effective length of the heater may be adjusted for mounting the heater and control device between opposing wall surfaces of an enclosed area such as in a piano, cigar case or other cabinet-like structure in which control of the humidity conditions is desired.

10. A humidity control apparatus for use in an enclosed area subject to changes in humidity conditions comprising a housing and a dehumidifier enclosed in the area, means for supplying electrical energy to said housing, means in said housing in electrical connection with said dehumidifier, and switch means in said housing responsive to changes in humidity within the enclosed area for selective contact with said electrical connection means to the dehumidifier for supplying electrical energy thereto in accordance with the positioning of the switch means in response to humidity conditions in the enclosed area, said housing spaced in predetermined relation from the dehumidifier to accurately control the feedback of drying heat from the dehumidifier to the switch means to proportionally vary the operation of the dehumidifier by cycling.

11. The structure as defined in claim 6 wherein said housing is provided with openings to enable circulation of ambient air between the interior of the housing and the enclosed area, the heater being provided with a longitudinally adjustable end member on at least one end thereof, and a pointed member extending axially from each end of the heater whereby the effective length of the heater may be adjusted for mounting the heater and control device between opposing wall surfaces of an enclosed area such as in a piano, cigar case or other cabinet-like structure in which control of the humidity conditions is desired, and an outlet socket in the housing electrically connected to the switch means for energizing the outlet when humidity conditions in the enclosed area drop below a predetermined relative humidity for energizing the outlet socket, said outlet socket adapted to be electrically connected to a humidifier for increasing the relative humidity when the relative humidity in the enclosed area reaches a preset low condition, said clip means including a pair of spring clips disposed in longitudinally spaced relation on said housing, and a non-metallic mounting member interposed between the housing and each clip.

References Cited
UNITED STATES PATENTS

| | | | |
|---|---|---|---|
| 2,103,904 | 12/1937 | Hill | 236—44 C |
| 2,222,628 | 11/1940 | Newton | 236—44 X |
| 2,715,056 | 8/1965 | Wilson | 237—78 X |
| 3,323,784 | 6/1964 | Fazio | 236—44 |

EDWARD J. MICHAEL, Primary Examiner